United States Patent
Rajenderan et al.

(10) Patent No.: US 11,455,318 B2
(45) Date of Patent: Sep. 27, 2022

(54) DATA REPLICATION USING PROBABILISTIC REPLICATION FILTERS

(71) Applicant: MICROSOFT TECHNOLOGY LICENSING, LLC, Redmond, WA (US)

(72) Inventors: Amog Rajenderan, Seattle, WA (US); Marcus Eduardo Markiewicz, Teaneck, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 412 days.

(21) Appl. No.: 16/279,920

(22) Filed: Feb. 19, 2019

(65) Prior Publication Data

US 2020/0265064 A1 Aug. 20, 2020

(51) Int. Cl.
*G06F 16/27* (2019.01)
*G06N 7/00* (2006.01)

(52) U.S. Cl.
CPC ............. *G06F 16/27* (2019.01); *G06N 7/005* (2013.01)

(58) Field of Classification Search
CPC .. G06F 16/27; G06F 2201/80; G06F 11/2094; G06F 16/20; G06N 7/005
USPC ........................................................ 707/634
See application file for complete search history.

(56) References Cited

U.S. PATENT DOCUMENTS

| | | |
|---|---|---|
| 7,152,076 B2 | 12/2006 | Sundararajan et al. |
| 2003/0093413 A1 | 5/2003 | Dettinger et al. |
| 2004/0148317 A1* | 7/2004 | Sundararajan ........ G06F 16/275 |
| 2010/0100529 A1* | 4/2010 | Erofeev ................ G06F 16/184 |
| | | 714/48 |
| 2011/0227790 A1 | 9/2011 | Li et al. |
| 2015/0358234 A1* | 12/2015 | Krieger ................ H04W 12/02 |
| | | 709/235 |

OTHER PUBLICATIONS

"International Search Report and Written Opinion Issued in PCT Application No. PCT/US20/016902", dated Apr. 24, 2020, 11 Pages.

* cited by examiner

*Primary Examiner* — Hosain T Alam
*Assistant Examiner* — Tracy M McGhee
(74) *Attorney, Agent, or Firm* — NovoTechIP International PLLC

(57) ABSTRACT

A method of and system for asynchronous replication of data from a source database to a destination database is carried out by utilizing a probabilistic replication filter to manage the state of replication. The method may include receiving a list of identifiers for a plurality of entities in a data set in the source database, loading at least a portion of the list into a probabilistic replication filter, the portion including an identifier for each one of the plurality of entities in the data set that have not yet been replicated in the destination database, examining the list of identifiers to determine if a first identifier is in the probabilistic replication filter, and upon determining that the first identifier is in the probabilistic replication filter, replicating an entity associated with the first identifier and removing the first identifier from the probabilistic replication filter.

13 Claims, 11 Drawing Sheets

DATA REPLICATION USING PROBABILISTIC REPLICATION FILTERS

TECHNICAL FIELD

This disclosure relates generally to replication of data and, more particularly, to an improved method of and system for asynchronous replication of data utilizing an efficient mechanism for tracking status of data replication.

BACKGROUND

The need to replicate data sets is becoming increasingly important. Some common examples include local data replication, server to server data replication, server to client data replication, local to cloud data replication, cloud to cloud data replication and client to client data replication. Local data replication may be used to provide data redundancy in a single system. Server to server replication may provide for greater data redundancy in case of faults, as well as increased data availability, load balancing, and geographic proximity between users and data. Server to client data replication may enable access to replicated data on a client device. For example, replicated data may be accessed on a desktop computer at an office or on a portable laptop computer at a remote location. Client to client replication may provide access to replicated data on multiple client devices. For example, data may be changed on a desktop and replicated on a portable laptop computer at a remote location. Data replication may also be used to replicate data between different types of systems when transferring data from one type of technology for storage to a different type.

When the amount of data that is being replicated is significantly large, for example in large relational data sets with millions of rows per table, replicating the data efficiently can become a challenging task. One of the main sources of difficulty in replicating large data sets is keeping track of the status of data replication. This may become a particularly cumbersome task when a need arises to keep track of any changes to the data as it is being replicated. Because replication can take place over a large span of time and multiple process lifetimes, often times changes may be made to the data as it is being replicated. Keeping track of changes and managing the state of replication at each process lifecycle in an efficient manner may require a substantial amount of resources and could negatively affect performance.

Hence, there is a need for an improved method and system for asynchronous replication of data which uses an efficient mechanism for tracking the status of data replication.

SUMMARY

In one general aspect, the instant application describes a device having a processor and a memory in communication with the processor where the memory comprises executable instructions that, when executed by the processors, cause the device to perform multiple functions. The function may include receiving a list of identifiers for a plurality of entities in a data set in a source database, the list of identifiers identifying the entities in the data set for replication from the source database to a destination database; loading at least a portion of the list into a probabilistic replication filter, the at least one portion including an identifier for each one of the plurality of entities in the data set that have not yet been replicated in the destination database; examining the list of identifiers to determine if an identifier is in the probabilistic replication filter; and upon determining that the identifier is in the probabilistic replication filter, replicating an entity associated with the identifier from the source database to the destination database and removing the identifier from the probabilistic replication filter.

In yet another general aspect, the instant application describes a method for asynchronous replication of data from a source database to a destination database where the method includes the steps of receiving a list of identifiers for a plurality of entities in a data set in the source database; loading at least a portion of the list into a probabilistic replication filter, the at least one portion including an identifier for each one of the plurality of entities in the data set that have not yet been replicated in the destination database; examining the list of identifiers to determine if an identifier is in the probabilistic replication filter; and upon determining that the identifier is in the probabilistic replication filter, replicating an entity associated with the identifier from the source database to the destination database and removing the identifier from the probabilistic replication filter.

In a further general aspect, the instant application describes a non-transitory computer readable medium on which are stored instructions that when executed cause a programmable device to receive a list of identifiers for a plurality of entities in a data set in the source database; load at least a portion of the list into a probabilistic replication filter, the at least one portion including an identifier for each one of the plurality of entities in the data set that have not yet been replicated in the destination database; examine the list of identifiers to determine if an identifier is in the probabilistic replication filter; and upon determining that the identifier is in the probabilistic replication filter, replicate an entity associated with the identifier from the source database to the destination database and removing the identifier from the probabilistic replication filter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
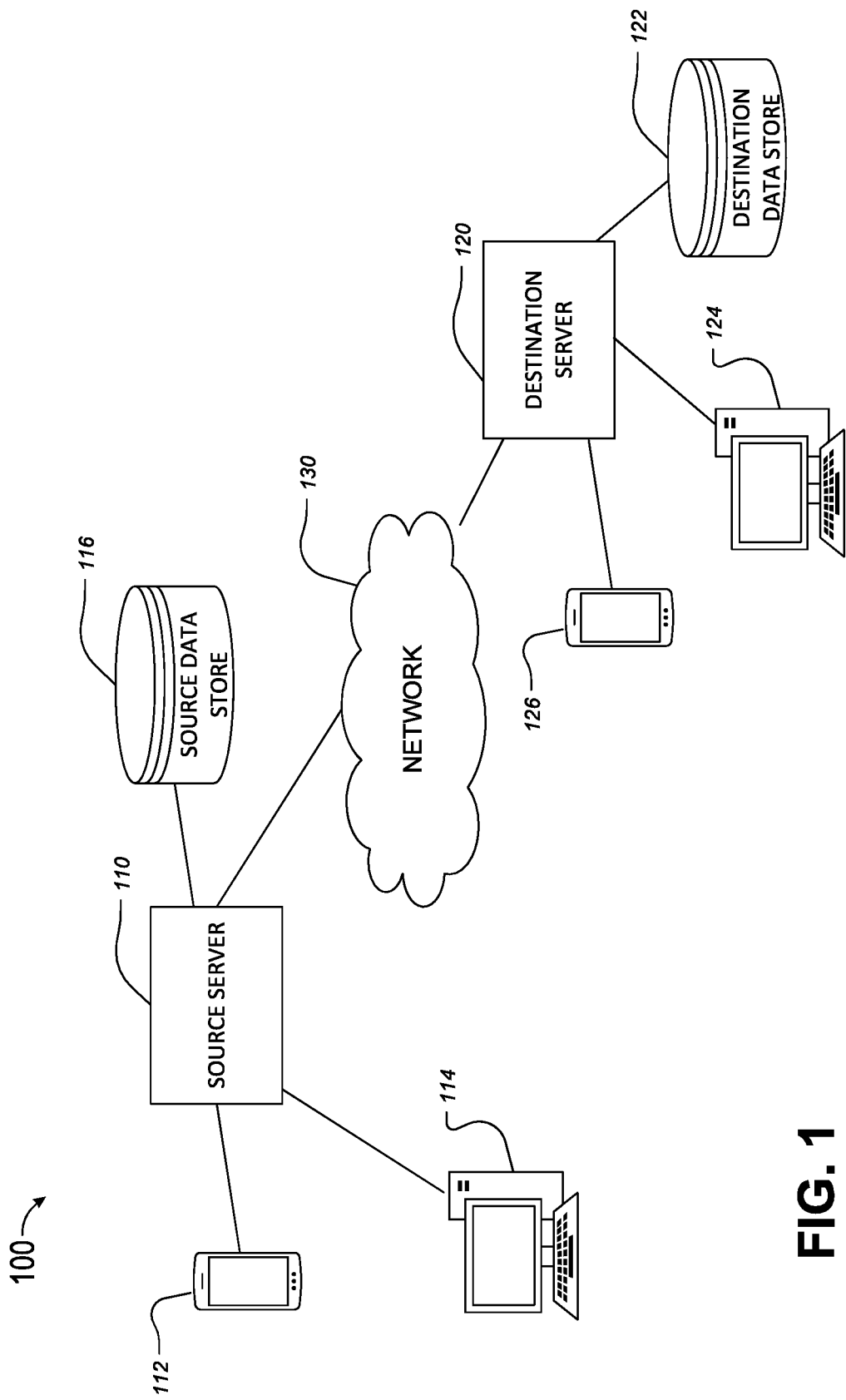
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

One limitation of existing data replication methods is that a list of each entity being replicated in a data set needs to be maintained to keep track of entities that have been replicated and those that have been modified since they were replicated. This is generally tracked in both the source and destination systems and needs to be stored in persistent storage such that when replication occurs over multiple process lifetimes, the systems has a record of the status of replication, which may change as replication progresses. For large data sets, this can become prohibitive as the list grows. For example, storing and updating the list of entities could require a significant amount of input-output (IO) resources for the replication task. For small devices, such as personal and mobile devices, such a replication task could significantly affect performance and usability of the device. Thus, there is a need in the art for data replication methods that can keep track of the status of data replication in an efficient and less costly manner.

To address these issues and more, in an example, this description provides technology implemented for an improved method and system of asynchronous data replication using a probabilistic replication filter (PRF). To improve the current methods of asynchronous data replication, the technical solution makes use of PRFs to track entities that still need to be replicated. Thus, instead of storing all the identifiers of entities in both source and destination systems and having to persist them (which may make the start-up of the replication system slow), probabilistic structures may be used for storing the status of the replication. This results in a compact representation that instead of tracking all entities, may only track entities that remain to be replicated. In one implementation, a PRF resulting in false positives, but not false negatives, such as a cuckoo filter may be used. By using such a PRF, the method provides for altering the rate of false positives to a specific percentage of the data set. By setting the filter size to something that yields a small number of false positives for large data sets, the cost of performing Create, Read, Update, and delete (CRUD) operations on the filter and thus of managing the replication state can be significantly reduced. This can be used, for example, to move data between a first version persistent layer to a second version persistent layer between data stores having different schemas, layout and/or technology without requiring client outage and performing the replication in a manner that minimizes performance impact as data is moved in the background. As a result, the solution provides an efficient and accurate method of asynchronous data replication that significantly improves customer experience.

As will be understood by persons of skill in the art upon reading this disclosure, benefits and advantages provided by such implementations can include, but are not limited to, a solution to the technical problems of inefficient, resource-intensive and undesired client experience while performing data replication. Technical solutions and implementations provided here optimize and improve the process of asynchronous data replication. The benefits provided by these solutions include providing increased efficiency and usability of systems while data replication takes place.

FIG. 1 illustrates an example system 100, upon which aspects of this disclosure may be implemented. The system 100 may be implemented in a single site or spread out in a number of buildings or geographically separated locations. The system 100 may include a source sever 110 which may be connected to or include a source data store 116 from which data may be replicated. The system 110 may also include source clients 112 and 114 connected to the source server 110. The source clients 112 and 114 may be used to access and/or modify the data in the source data store. Furthermore, source clients 112 and 114 may themselves include data which may be replicated. The source data store 116, and source clients 112 and 114 may be connected locally to the source server 110, via the network 130 or via one or more separate networks.

The source server 110, source clients 112 and 114 and source data store 116 may be connected to a destination server 120, which may in turn be coupled to destination clients 124 and 126 and destination data store 122. The destination clients 126 and 126 may be connected to the destination server 120 locally, via the network 130 or through one or more separate networks. Although shown as a separate element, the destination data store 122 may be a part of the destination server 120 or the destination client devices 124 and 126.

The client devices 112, 114, 124 and 126 may be personal or handheld computing devices having both input elements and output elements. For example, the client devices 112, 114, 124 and 126 may be one of: a mobile telephone; a smart phone; a tablet; a phablet; a smart watch; a wearable computer; a personal computer; a desktop computer; a laptop computer; a gaming device/computer; a television; and the like. This list is for example purposes only and should not be considered as limiting. The network 110 may be a wired or wireless network or a combination of wired and wireless networks that connects one or more elements of the system 100.

A user may be able to access the source data store 116 and/or make changes to it via the source clients 112 and/or source client 114. For example, the user may access the data store 116 and modify one or more entities of the data store during the data replication process.

The system 100 can be used to support server to server replication between multiple servers such as the source server 110 and destination server 120. The system 100 can also be used to support server to client replication between a server and its dedicated clients, such as between the source server 110 and source clients 112 and 114, or between destination server 120 and destination clients 124 and 126. The system 100 may further support peer to peer replication between a group of client devices such as source clients 112 and 114 or destination clients 124 and 126. Furthermore, the system 100 can be used to support local replication within each of the servers 110 or 120 or between source data store 116 and destination data store 122, which may have different schemas, layout and/or technology.

Figure 2:
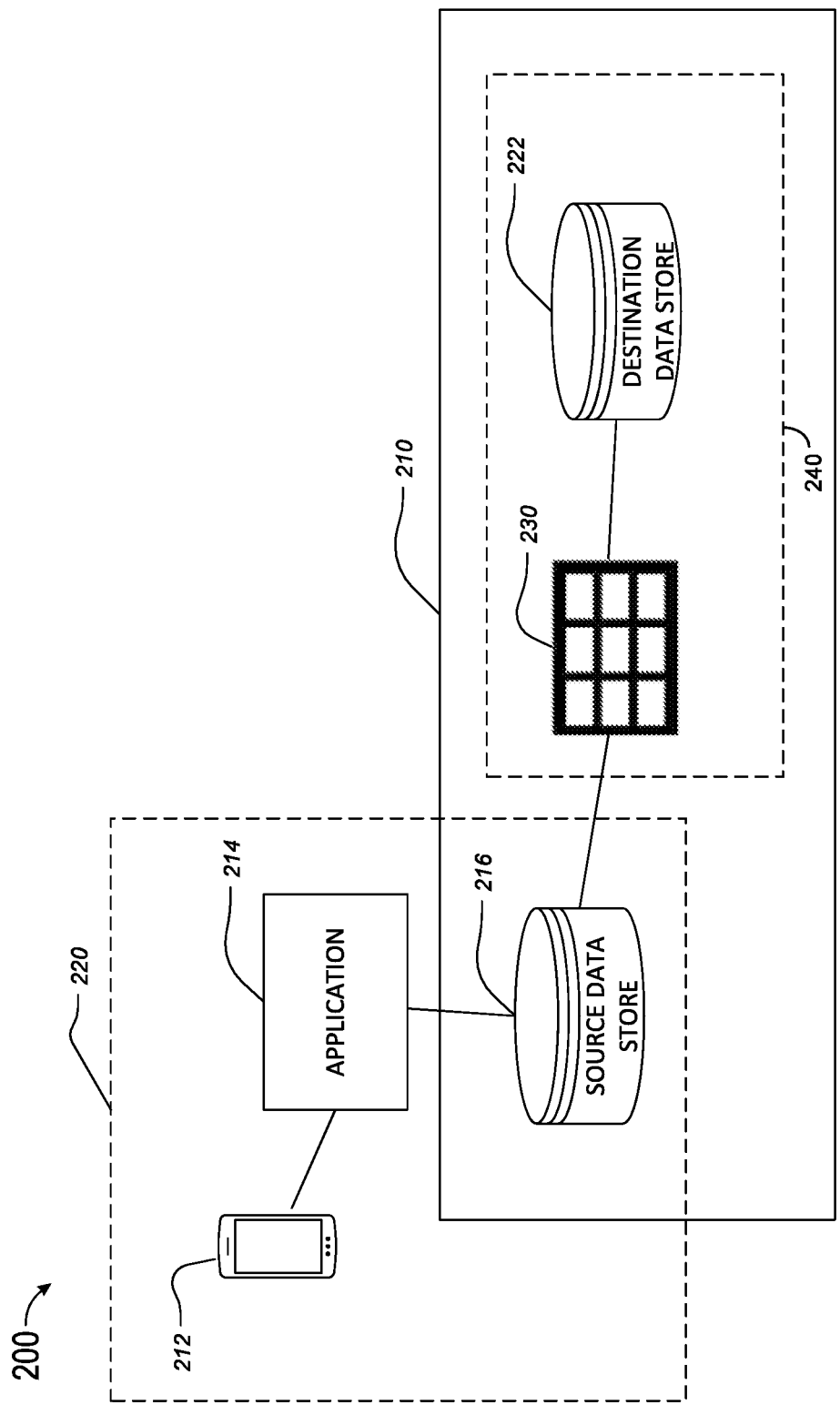
FIG. 2 depicts an example environment 200, upon which aspects of this disclosure may be implemented.

FIG. 2 illustrates an example environment 200, upon which aspects of this disclosure may be implemented. The environment 200 may include a source unit 220, a replication system 210 and a destination unit 240. The source unit 220 may include a source data store 216, a source client device 212 and an application 214. Although shown as separate elements, the application 214 and source data store 216 may be parts of the source client device 212. For example, the source data store 216 may be a database stored on the source client device 212. Moreover, the application 214 may be an application installed on source client device 212. Alternatively, the application 214 and/or the source data store 216 may be stored on a separate device or server and may be accessible to the source client device 212 via a network.

The source data store 216 may include a plurality of data sets that can be accessed, modified and replicated. The data sets may include relational data sets (e.g., structured query language (SQL) data sets), having for example a large number of rows per table, or non-relational data sets (NoSQL). Data within the data sets may be accessed by the source client device 212 via the application 214. The application 214 may be any user application that provides access to the underlying data. For example, the application may be a word processing application (e.g. Microsoft Word®) or a data processing application (e.g. Microsoft Excel®, Microsoft) PowerPoint®, and the like. In one implementation, a user may have access to and be able to modify the underlying data (e.g., rows of an Excel spreadsheet), while the data set containing the data is being replicated. This may occur, for example, during replications that involve large data sets and take a long amount of time. Actions within the source unit 220 may be atomic.

The replication system 210 may include the source data store 216, a PRF 230 and a destination data store 222. Data may be replicated from the source data store 216 to the destination data store 222. The source data store 216 and the destination data store 222 may be stored in different systems. For example, the source data store 216 and the destination data store 222 may have different schemas, layout and/or be associated with different technologies. Furthermore, the data sets being replicated may have different schemas. For example, a relational data set in the source data store 216 may be replicated to a non-relational data set in the destination data store 222. The source data store 216 may be connected to the destination data store 222 either locally or via a network such as the network 130 of FIG. 1.

The PRF 230 may be a probabilistic data structure that can be used to add fingerprints representative of one or more entities to a set. Thus, the data structure may function similar to a hash table in that it can use a hash function to map an element to a bucket (e.g., a set). Similar to a hash table, the set may not need to store the element itself. Instead, it can simply mark it as filled. In this manner, the elements themselves, which may be large in size, do not need to be added to the set. Instead a fingerprint of the elements which may be a lot smaller in size can be added to represent the element. The set may then be examined quickly to determine if an element is in the set. Thus, the data structure may support quick testing of set membership. Such a probabilistic data structure can be very useful for testing of set membership when the size of the data set is large. Examples of such probabilistic data structures include cuckoo and bloom filters.

As it is known in the art, a cuckoo filter may have an array of buckets with each bucket having the capacity to hold a predetermined number of fingerprints. Moreover, a cuckoo filter may use cuckoo hashing (e.g., a type of collision handling in hash data structures) to resolve collisions, thus creating a compact cuckoo hash table. The resulting cuckoo hash table may use single bits to store data. Similar to a bloom filter which may use single bits to store data, the cuckoo filter may use a small n-bit fingerprint to represent data. The value of n can be varied and may depend on several factors. For example, an administrator may set the value of n, depending on the size of the data set. By using a small size fingerprint to represent the data, use of such data structures can significantly reduce the amount of resources required to track a replication process.

Use of a probabilistic data structure such as a bloom or cuckoo filter is also beneficial, because these filters can return false positives with a predetermined probability, but not false negatives. In this manner, determining if an entity of a data set has been replicated may result in a false positive (e.g., an entity that has been replicated may be indicated as not yet having been replicated), but it does not result in a determination that the entity has been replicated, when it has not yet been replicated. The value of n (i.e., the size of the fingerprint) may be decided based on the desired rate of false positives. Furthermore, the desired rate of false positives may be set depending on the size of the data set. In one implementation, the desired rate of false positives may be tuned to a specific percentage of the data set. In this manner, the disadvantage of replicating the same entity multiple times can be weighed against the size of the filter and the limitations of the system. For example, if data is being replicated from or to a client device, having limited processing capability, the size of the filter may be reduced. In one implementation, the size of the filter may be set to a specific size (e.g., less than 1 MB). For a cuckoo filter, this may yield a small number of false positives in data sets of millions of entities. This could reduce the cost of performing operations such CRUD operations on the filter and thus help in managing the state of replication.

Thus, a PRF 230 may be used to store representations for entities being replicated from a data set in the source data store 216 to a data set in the destination data store 222. In one implementation, the PRF 230 may only store representations for entities that have not yet been replicated. In this manner, the PRF 230 would not need to store representations for the entire the data set. Furthermore, the PRF 230 would be continually updated as data is being replicated and/or modified.

In one implementation, actions within the source unit 220 and within the destination unit 240 are atomic. Furthermore, actions between the source data store 216 and the PRF 230 may be atomic. Thus, a change made to the source data store 216, for example via a CRUD operation on an entity in the data set may automatically result in a change in the PRF 230. For example, if an entity that has already been replicated is modified, the PRF 230 may be updated to add a representation for the entity to ensure the modified entity is also replicated. In another example, if an entity that has not been replicated yet is deleted, the PFR 230 may be updated to delete its corresponding representation from the filter. Furthermore, when an entity has been replicated to the destination data store, the PRF 230 may be updated to remove its representation from the filter. Thus, any changes in the set of entities in the source data store 216 may result in a change in the PRF 230.

It should be noted that although FIG. 2 displays the replication of data in one direction from the source data store 216 to the destination data store 222, replication could be occurring in both directions. For example, one data set from the source data store 216 may be replicated to the destination data store 222, while a different data set from the destination data store 222 is being replicated in the source data store. Furthermore, multiple replications may be occurring at the same time. However, each replication may require a separate PRF 230 to keep track of the status of each replication.

Moreover, it should be noted that although PRF 230 is shown as being a part of the destination unit 240, the filter could be stored in the source data store, the destination data store or separately from the source and destination data stores in a memory of the source client device, the destination device or another device in the network. For example, the PRF 230 may be stored in any storage device accessible to the replication system that provides persistent storage. Persistent storage may be important in ensuring that even if there is a pause in replication, it can be resumed from where it stopped. This would require that the PRF keep a list of un-replicated entities and their status until replication is completed.

Figure 3A:
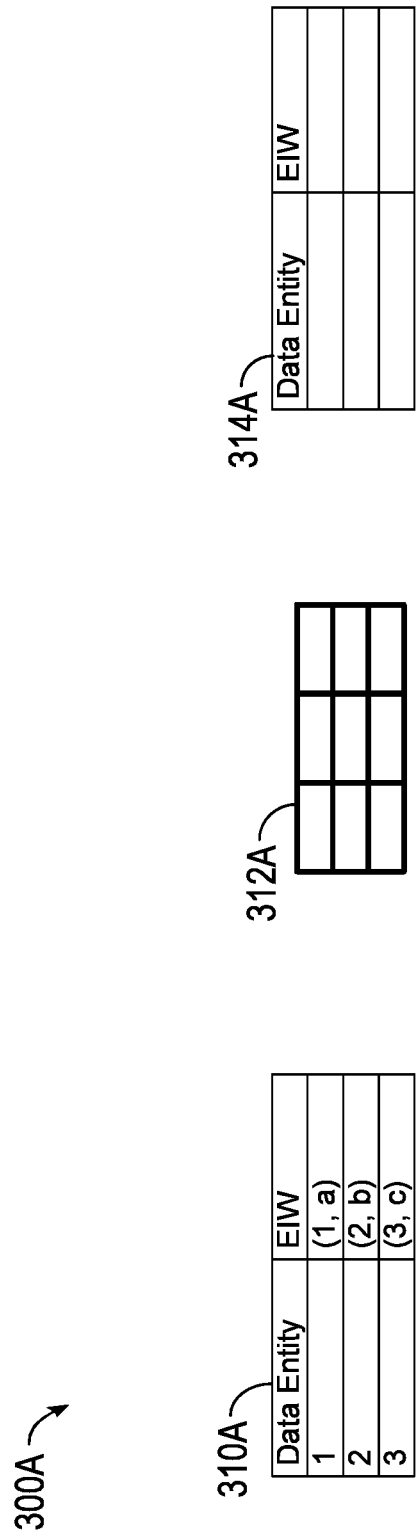
FIGS. 3A-3F depict various stages of a replication process utilizing a probabilistic replication filter for replicating an example source data set to a destination data set.

FIGS. 3A-3D depict various stages of a replication process utilizing a PRF for replicating an example source data set into a destination data set. FIG. 3A illustrates a first stage 300A for an example source table 310A, a PRF 312A and a destination table 314A prior to the start of data replication.

The source table 310A includes example data entities 1 through 3. Each data entity may be a row in a table in a data set or any other type of data entity containing data. Thus, the numbers 1 through 3 are representatives of the entities and not representative of the data in each entity. Moreover, the source table 310A is only shown for illustrative purposes to show the status of the data being replicated and is not representative of an actual table used during the replication process. Similarly, the destination table 314A is only shown for illustrative purpose to depict the state of entities that have been replicated and is not representative of an actual table used during the replication process. As illustrated, prior to the start of replication, both the PRF 312A and the destination table 314A may be empty.

To ensure the replication state of each entity can be properly tracked during data replication, an identifier may be used for each entity. The identifier may represent an entity's native identity in the system and a watermark that indicates the version of that entity. The entity's native identity may for example be the primary key value of each row of a table when the entity is a row in the table. The watermark, in turn, may for example be a monotonically increasing revision number that is updated every time that entity is revised. The identifier may be referred to as an entity-identity-watermark (EIW). Thus, an example EIW for an entity 1 may be (1, a), while the EIW for entity 2 may be (2, b), and the like.

Figure 3B:
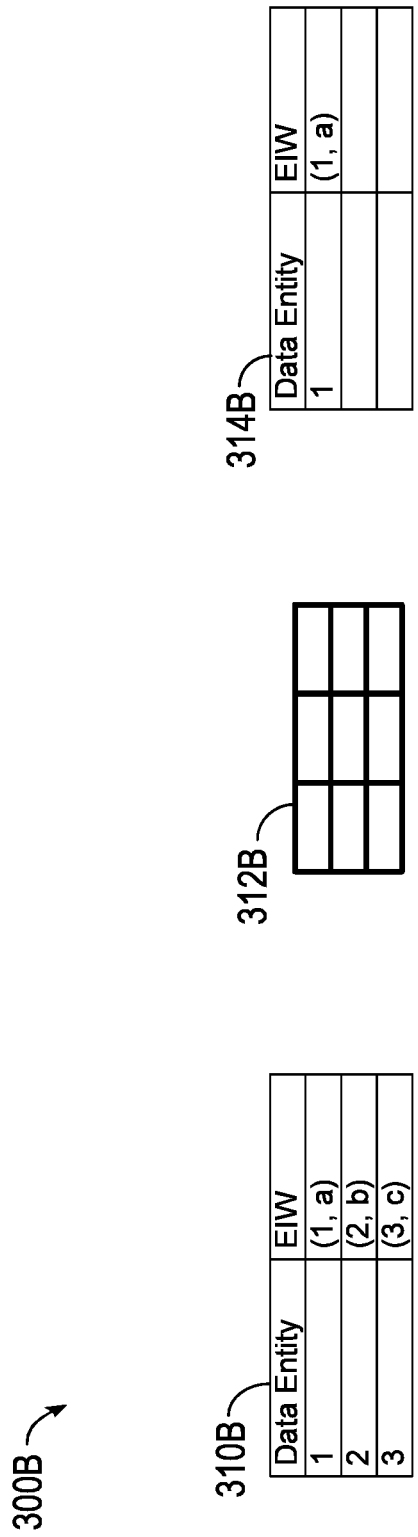
Figure 3C:
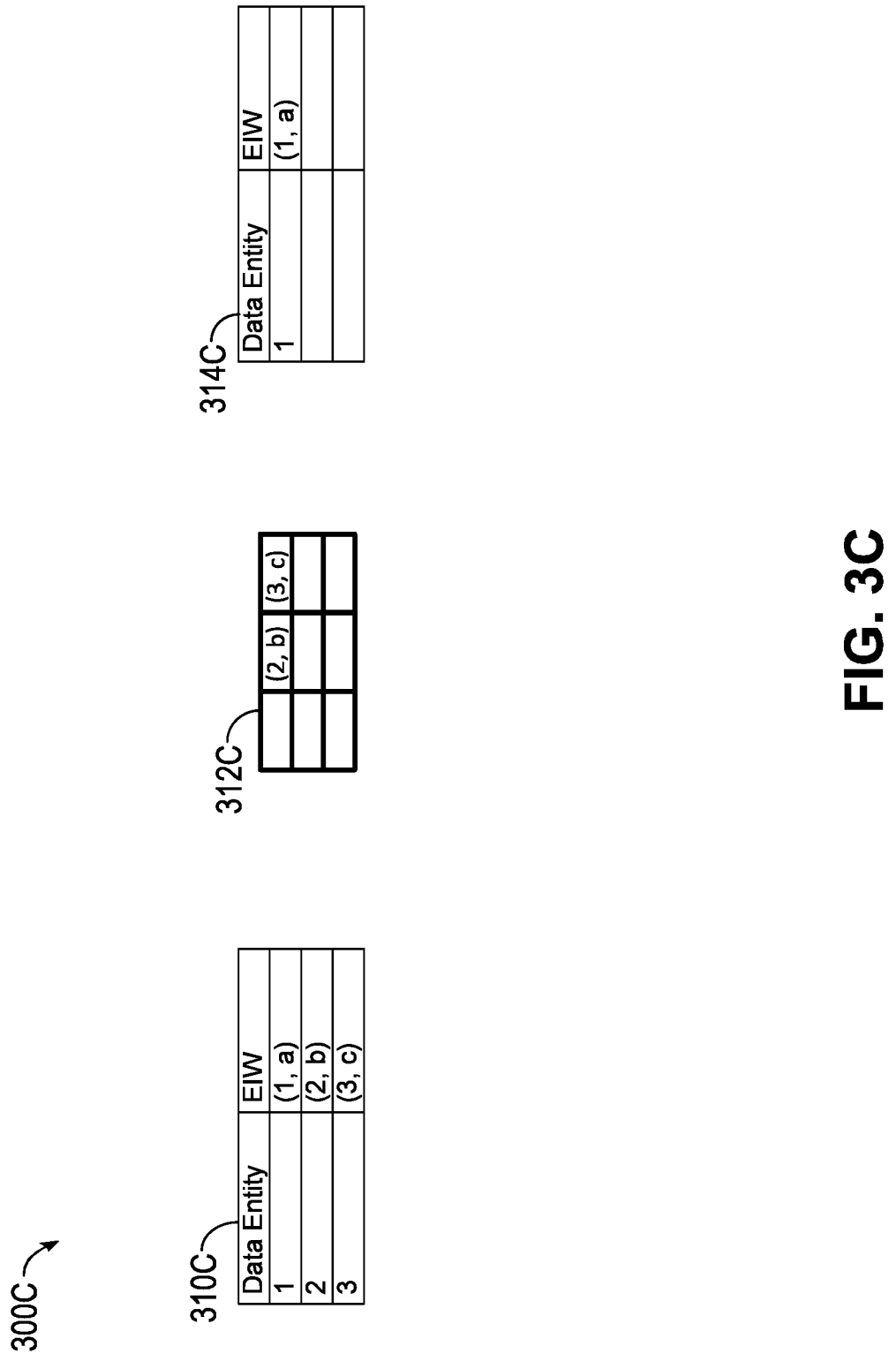

FIG. 3B depicts a second stage 300B for the source table 310B, PRF 312B and destination table 314B. This stage may represent the state of these elements right after replication has started and the first entity has been replicated. In such an instance, the destination table 314B may include the data entity 1 having the EIW (1, a) before the PEF 312B is loaded. Once replication starts (e.g., the first entity is replicated), the PRF may be loaded as illustrated by PRF 312C of FIG. 3C. At this stage 300C, the PFR buckets may be filled with fingerprints for un-replicated entities of the source data set. Thus, EIWs of data entities 2 and 3 may be loaded into the PRF 312C. This may inform the replication system that entities 2 and 3 having revision identifiers b and c, respectively, are yet to be replicated.

Figure 3D:
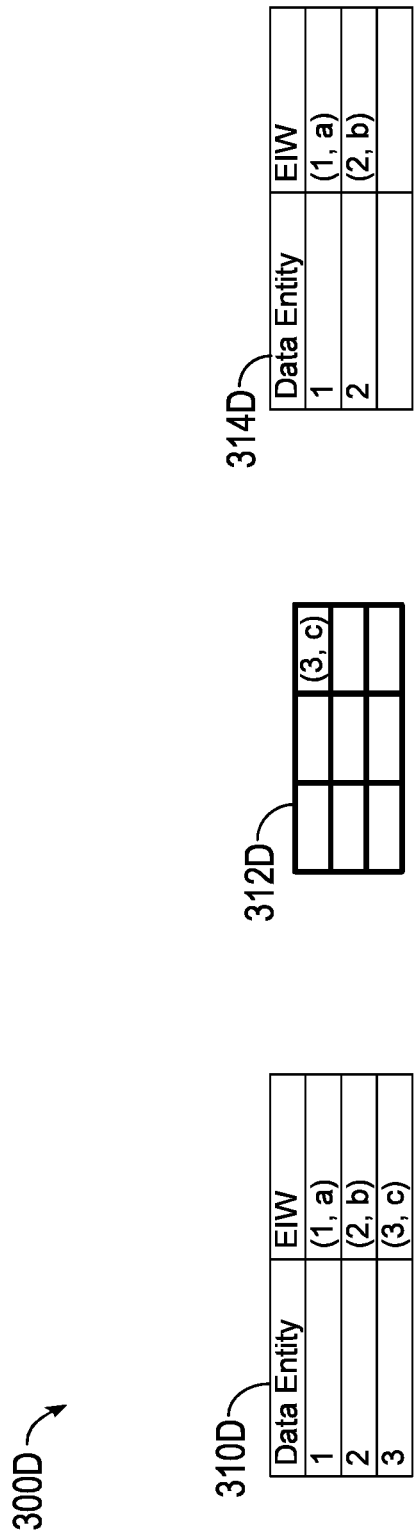

FIG. 3D illustrates a stage 300D which depicts the source table 310D, PRF 312D and destination table 314A after entity 2 has been replicated. Once entity 2 is replicated, PRF 312D is automatically updated to remove the EIW of entity 2 from the filter. At this state, PRF 312D only includes the EIW of entity 3 which is yet to be replicated. Subsequent to replication of entity 2, a change may be made to the entity.

Figure 3E:
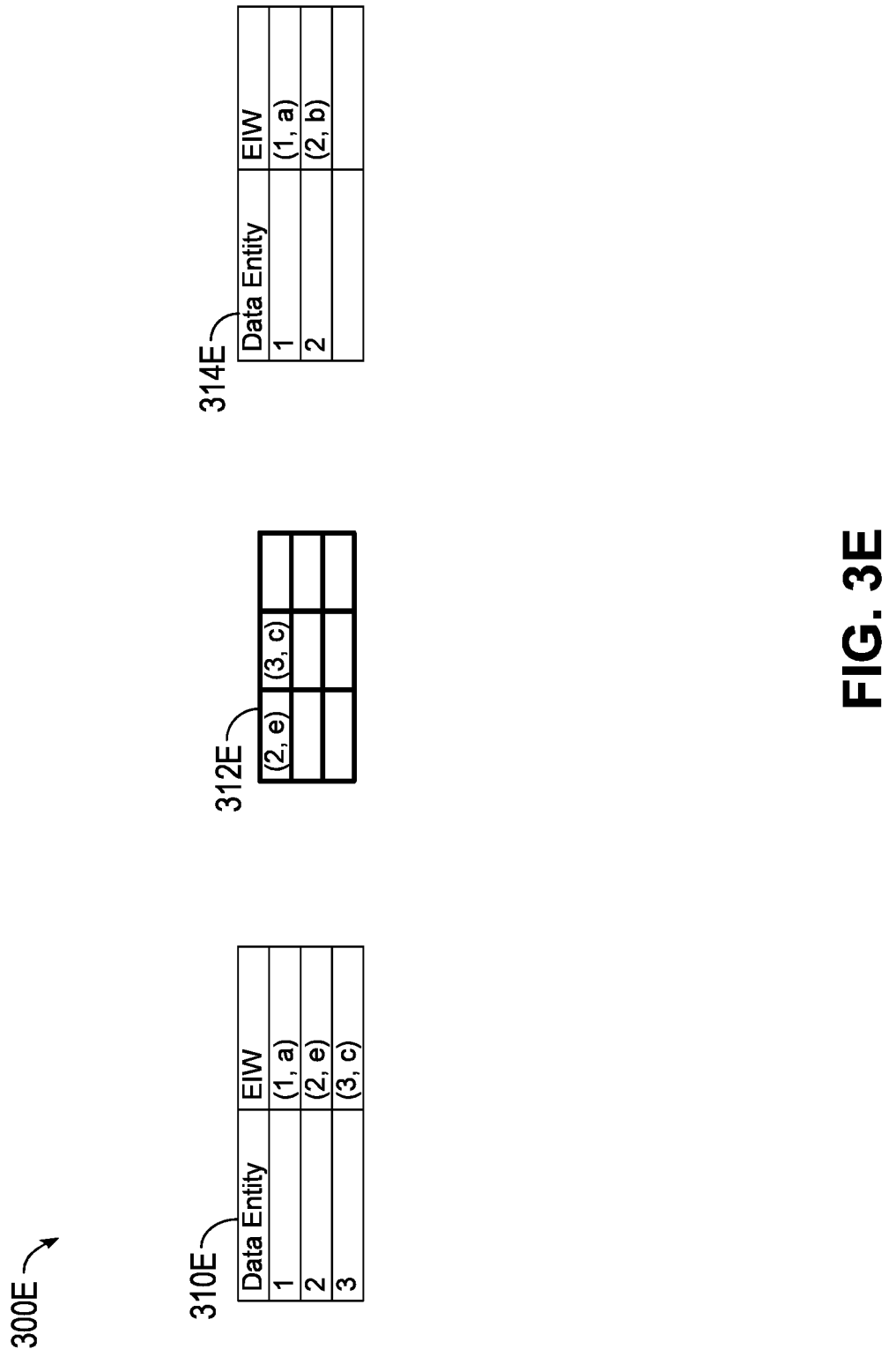

For example, the entity may be modified via an application that provides access to the data set. Once a modification has been made, the EIW for the entity is automatically changed to reflect a different version number for the entity. This is illustrated in FIG. 3E which depicts a stage 300E for after a modification has been made to entity 2. Stage 300E of data replication includes a source table 310E having an EIW of (2, e) for entity 2. Correspondingly, this stage includes a PRF 312E having an EIW (2, e) in one of its buckets. Thus, even though entity 2 has already been replicated and removed from the PRF, as soon as a modification is made to the entity in the source data set, the PRF is atomically changed to include the modified entity.

Figure 3F:
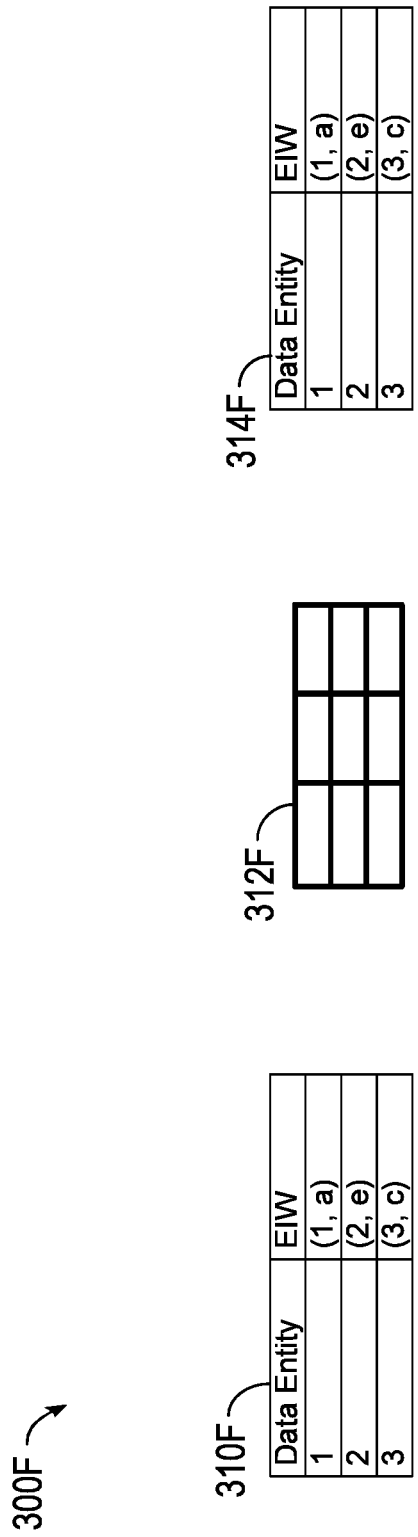

FIG. 3F depicts a subsequent stage 300F of the data replication, when both the modified entity 2 and the next entity 3 have been replicated. At this stage, the EIWs are deleted from the PRF 312F resulting in an empty PRF and the source and destination tables 310F and 314F include the same entities. This signals the end of the replication process. In this manner, by using a PRF that stores EIWs for entities of the data set, a compact easily modifiable data table can be used to track the state of replication for a large number of entities.

Figure 4:
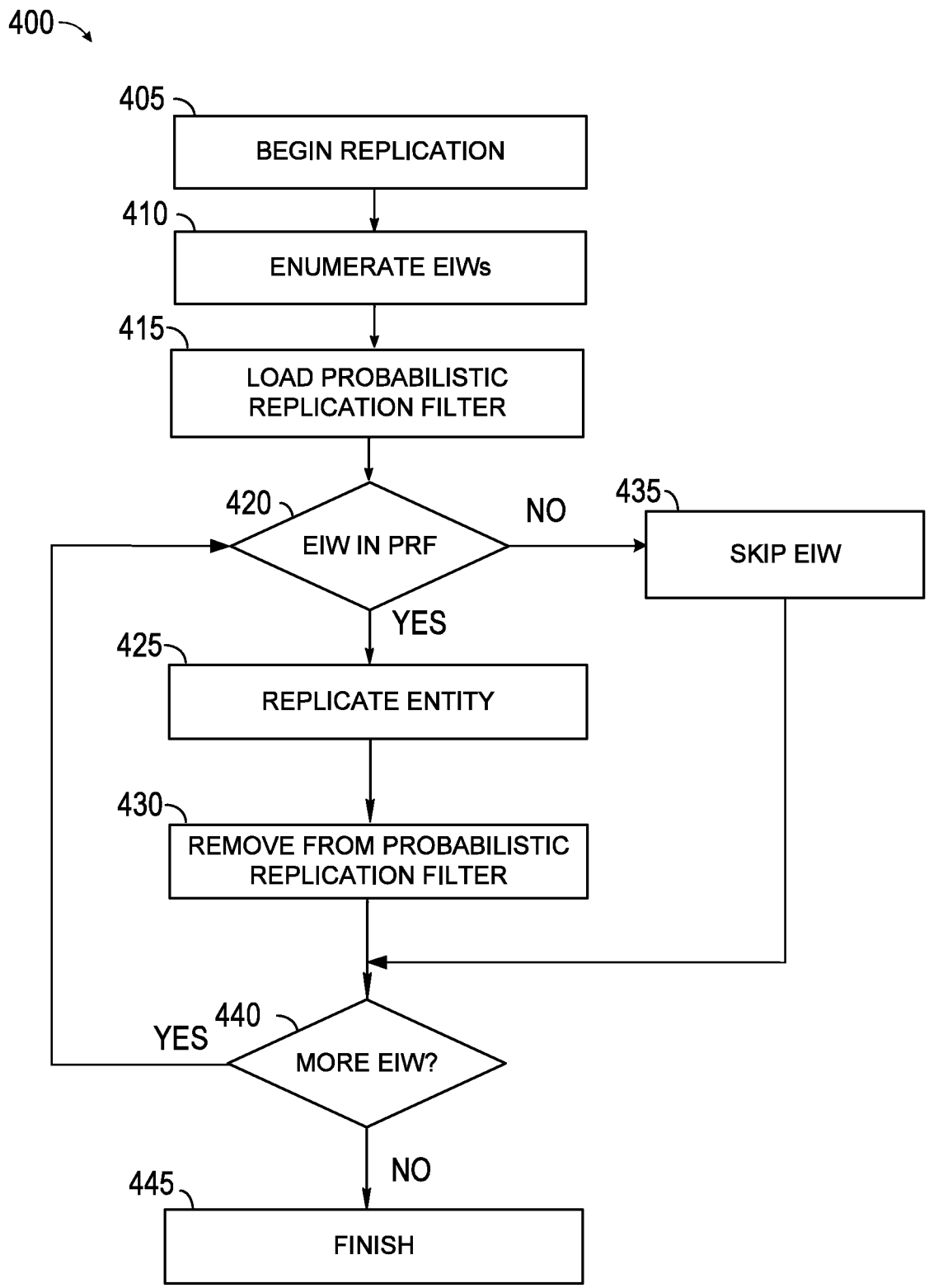
FIG. 4 is a flow diagram showing an example method for asynchronous data replication using a probabilistic replication filter.

FIG. 4 is a flow diagram depicting an example method 400 for asynchronous data replication using a probabilistic replication filter. At 405, method 400 may begin by starting a replication process. This may occur, for example, when a replication service initiates replication of a data set from a source data store to a destination data store. The replication service may be a service (e.g., a remote service) that functions by utilizing one or more Application Programming Interfaces (APIs). For example, the process may be initiated as part of transferring data across different systems, updating a current system or program, or replicating data for redundancy purposes. The replication process may be initiated automatically (e.g., as part of a system update) or may be initiated by an administrator or user. In one implementation, the replication service may be a remote service which could be cloud-based. Alternatively, the service may be a local service and/or the replication operation may be performed offline.

Once the replication process is started, identifiers for the entities in the data set being replicated are enumerated, at 410. This may occur, for example, by receiving EIWs for the entities of the data set from the source data store. Thus, in one implementation, the source data store creates a list of EIWs based on the entities in the data set and transfers those EIWs to the replication service responsible for performing the asynchronous data replication. As entities are modified (e.g., added, deleted, or changed) during the replication process, the source data store may generate additional EIWs and/or in cases of changes made to an existing entity, modify an existing EIW to update its watermark and transfer the new or modified EIWs to the replication service. Once the EIWs are received, a probabilistic replication filter assigned to the replication process may be loaded with the EIWs of un-replicated entities, at 415. That is, the PRF may load EIWs of entities that are yet to be replicated in its buckets. In one implementation, modifications made to the data set are atomic in that you cannot make a modification to an entity of the data set, without the filter also being updated.

Once the PRF is loaded, method 400 may proceed to examine the list of EIWs. For each EIW in the list of received EIWs, method 400 may determine, at 420, whether the EIW is in the PRF. This may be done by examining the PRF to determine if the EIW is in a bucket of the PRF. When it is determined that the EIW is in the PRF, the entity associated with the EIW may be replicated in the destination data store, at 425. Once the entity is replicated, method 400 may proceed to remove the EIW from the PRF, at 430. This may be done to ensure that the same entity is not replicated multiple times. However, it should be noted that by using a PRF such as a cuckoo filter, some entities may be replicated more than once because of false positives in the filter.

When it is determined, at step 420, that an EIW is not in the PRF, method 400 may proceed to skip the EIW, at 435, and move to the next EIW. That is because, as discussed above, the PRF only loads EIWs of entities that have not yet been replicated and it removes an EIW as soon as its associated entity has been replicated. Thus, the PRF is designed to only include EIWs of entities that have not been replicated. In other words, if an EIW is not in the PRF, that means that the EIW has already been replicated.

After skipping the current EIW or after the entity associated with the current EIW has been replicated and the EIW is removed from the PRF, method 400 may proceed to determine if there are any other EIWs in the received set of the EIWs to be examined, at 440. This would include any EIWs for modified entities (e.g., those entities modified during the replication process). As discussed above, if an entity is modified, its associated EIW may be updated to include a proper version watermark and the updated EIW may be sent to the replication service which would in turn add the updated EIW to the PRF to ensure the modification is accounted for when replicating the data. Thus, while examining the list of EIWs, method 400 also looks for updated EIWs.

When it is determined, at step 440, that there are more EIWs that need to be examined, method 400 returns to step 425 to determine if the EIW is in the PRF and continue with the steps 425 through 440 as discussed above. However, when it is determined, at step 440, that no other unexamined EIWs remain in the list, method 400 may proceed to finish, at 445. At this stage, the PRF may be empty and all the data from the source data set is replicated in the destination data set.

Thus, in different implementations, an improved method and system may be provided to provide asynchronous data replication using a probabilistic replication filter. The probabilistic replication filter may be a tunable probabilistic data structure having a compact customizable size. In one implementation, the size of the customizable data structure may be kept constant even when the size of the data set being replicated is increasing. As a result, the footprint of a replication process for a large data set may be kept constant. This may be achieved by trading off a number of false positives in the filter with the size of the filter. Thus, replication of large sets of data may be achieved in an efficient and accurate manner having minimal effects on device performance.

Figure 5:
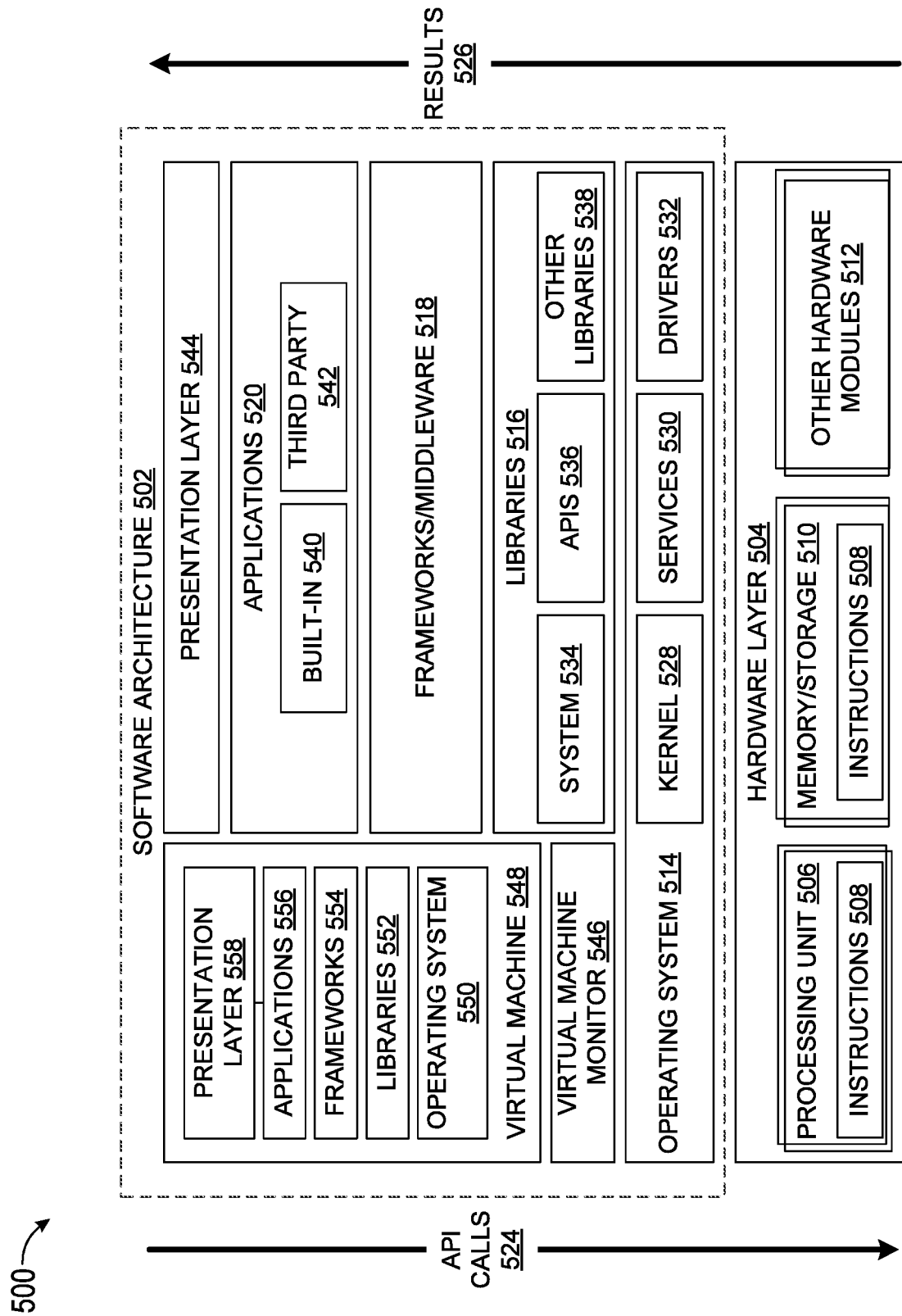
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 520 and/or third-party applications 522. Examples of built-in applications 520 may include, but are not limited to, a contacts application, a browser application, a location application, a media application, a messaging application, and/or a game application. Third-party applications 522 may include any applications developed by an entity other than the vendor of the particular system. The applications 520 may use functions available via OS 514, libraries 516, frameworks 518, and presentation layer 524 to create user interfaces to interact with users.

Some software architectures use virtual machines, as illustrated by a virtual machine 528. The virtual machine 528 provides an execution environment where applications/modules can execute as if they were executing on a hardware machine (such as the machine 600 of FIG. 6, for example). The virtual machine 528 may be hosted by a host OS (for example, OS 514) or hypervisor, and may have a virtual machine monitor 526 which manages operation of the virtual machine 528 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
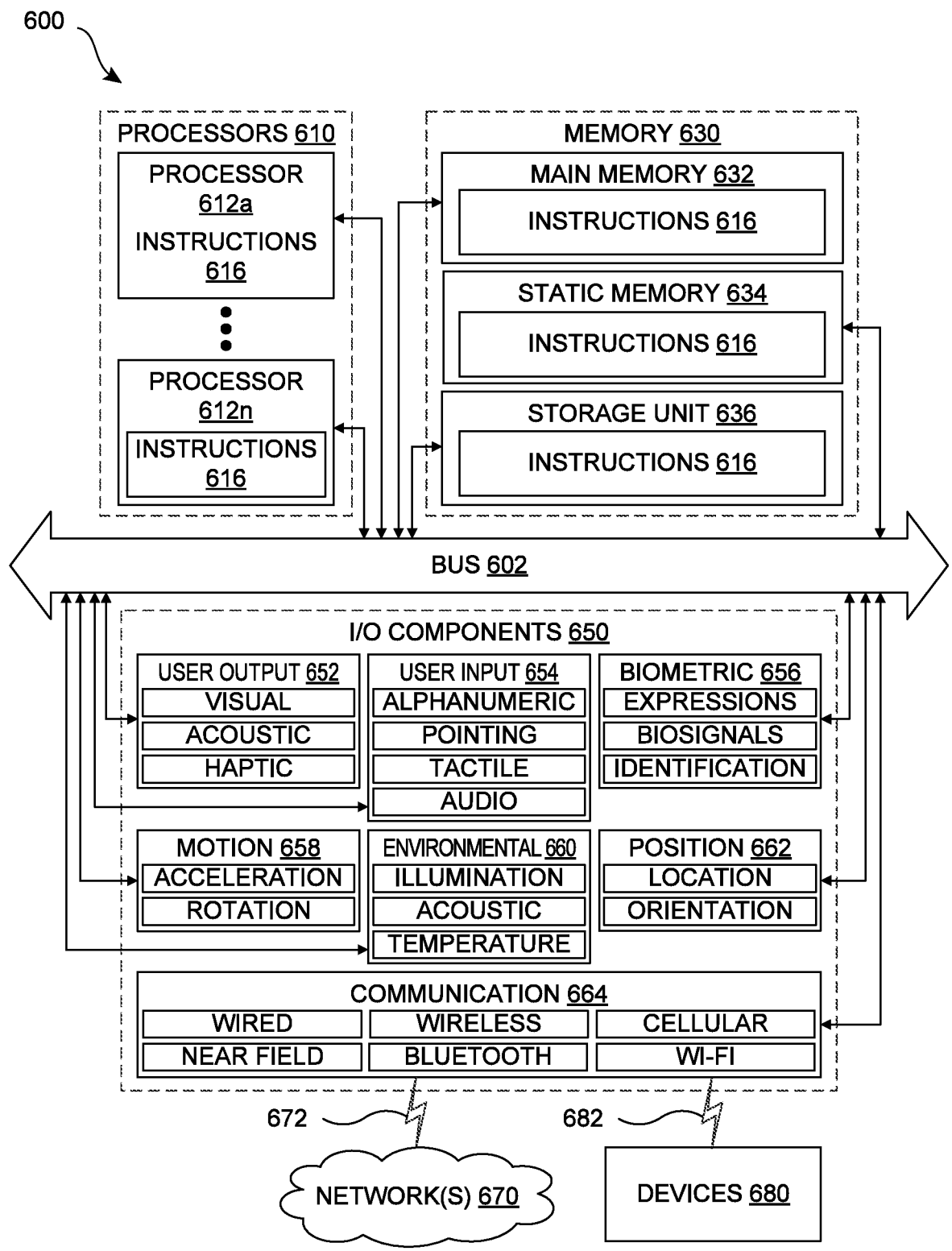
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
    a processor; and
    a memory in communication with the processor, the memory comprising executable instructions that, when executed by the processor, cause the device to perform functions of:
    receiving a list of identifiers for a plurality of entities in a data set in a source database, the list of identifiers identifying the entities in the data set for replication from the source database to a destination database;
    loading at least one portion of the list into a probabilistic replication filter, the at least one portion including an identifier for each one of the plurality of entities in the data set that have not yet been replicated in the destination database;
    examining the list of identifiers to determine if a first identifier is in the probabilistic replication filter; and
    upon determining that the first identifier is in the probabilistic replication filter, replicating an entity associated with the first identifier from the source database to the destination database and removing the first identifier from the probabilistic replication filter
        receiving an updated list of identifiers when at least one of the plurality of entities in the data set is modified, the updated list including an updated identifier associated with the modified entity; and
        loading the updated identifier into the probabilistic replication filter,
    wherein the list of identifiers includes an identifier for each entity in the plurality of entities and the identifier includes a first value for identifying the entity in the data set and a second value for indicating a version associated with the entity.

2. The device of claim 1, wherein the updated identifier includes an updated second value.

3. The device of claim 1, wherein the executable instructions, when executed by the processor, further cause the device to perform functions of disregarding the first identifier upon determining that the first identifier is not in the probabilistic replication filter.

4. The device of claim 1, wherein size of the probabilistic replication filter is customizable.

5. The device of claim 1, wherein the probabilistic replication filter is a cuckoo filter.

6. A method for asynchronous replication of data from a source database to a destination database, comprising:
    receiving a list of identifiers for a plurality of entities in a data set in the source database;
    loading at least one portion of the list into a probabilistic replication filter, the at least one portion including an identifier for each one of the plurality of entities in the data set that have not yet been replicated in the destination database;
    examining the list of identifiers to determine if a first identifier is in the probabilistic replication filter; and
    upon determining that the first identifier is in the probabilistic replication filter, replicating an entity associated with the first identifier from the source database to the destination database and removing the first identifier from the probabilistic replication filter
        receiving an updated list of identifiers when at least one of the plurality of entities in the data set is modified, the updated list including an updated identifier associated with the modified entity; and
        loading the updated identifier into the probabilistic replication filter,
    wherein the list of identifiers includes an identifier for each entity in the plurality of entities and the identifier includes a first value for identifying the entity in the data set and a second value for indicating a version associated with the entity.

7. The method of claim 6, wherein the updated identifier includes an updated second value.

8. The method of claim 6, wherein the probabilistic replication filter is a cuckoo filter.

9. A non-transitory computer readable medium on which are stored instructions that, when executed, cause a programmable device to:
    receive a list of identifiers for a plurality of entities in a data set in a source database, the list of identifiers identifying the plurality of entities in the data set for replication from the source database to a destination database;
    load at least one portion of the list into a probabilistic replication filter, the at least one portion including an identifier for each one of the plurality of entities in the data set that have not yet been replicated in the destination database;
    examine the list of identifiers to determine if a first identifier is in the probabilistic replication filter; and
    upon determining that the first identifier is in the probabilistic replication filter, replicate an entity associated with the first identifier from the source database to the destination database and remove the first identifier from the probabilistic replication filter,
    receive an updated list of identifiers when at least one of the plurality of entities in the data set is modified, the updated list including an updated identifier associated with the modified entity; and load the updated identifier into the probabilistic replication filter,
wherein the list of identifiers includes an identifier for each entity in the plurality of entities and the identifier includes a first value for identifying the entity in the data set and a second value for indicating a version associated with the entity.

10. The computer readable medium of claim 9, wherein the updated identifier includes an updated second value.

11. The computer readable medium of claim 9, wherein size of the probabilistic replication filter is customizable.

12. The device of claim 1, wherein each identifier in the list of identifiers includes a representation for an entity's native identity and a watermark that indicates a version of the entity.

13. The device of claim 1, wherein the probabilistic replication filter has an array of buckets, with each bucket of the array of buckets having a capacity to hold a predetermined number of identities.

* * * * *